United States Patent [19]

Hewitt et al.

[11] Patent Number: 5,136,769
[45] Date of Patent: Aug. 11, 1992

[54] METHOD OF EVALUATING A PARTIALLY ASSEMBLED BRAKE BOOSTER

[75] Inventors: Wayne A. Hewitt, LaPorte, Ind.; Ted A. Engeman, Sumter, S.C.

[73] Assignee: Allied-Signal Inc., Morristown, N.J.

[21] Appl. No.: 693,983

[22] Filed: Apr. 29, 1991

[51] Int. Cl.$^5$ .................................. B23Q 17/00
[52] U.S. Cl. ........................... 29/404; 29/888; 29/407
[58] Field of Search ............ 29/404, 407, 888.02, 29/888; 73/45.3, 46, 49.2, 49.3, 49.7, 49.8

[56] References Cited

U.S. PATENT DOCUMENTS

| | | | |
|---|---|---|---|
| 2,863,316 | 12/1958 | Abplanalp | 73/46 |
| 3,158,930 | 12/1964 | Wesstrom et al. | 29/186.4 R |
| 3,252,916 | 7/1944 | Schrader | 73/45.3 |
| 4,268,945 | 5/1981 | Arman et al. | 29/404 X |

Primary Examiner—Timothy V. Eley
Attorney, Agent, or Firm—Leo H. McCormick, Jr.; Ken C. Decker

[57] ABSTRACT

A method of evaluating the operational characteristics of a brake booster by simulating a brake application of partially assembled brake booster components. An input force to control valve located in a hub of a shell to create an output force which is communicated through a reaction disc to an output member. An initial operational curve corresponding to an output force is compared with a reference curve to either accepted or reject the partially assembled brake booster components. If accepted, additional components are joined to the partially assembled booster to complete the assembly. If rejected, spacers based on the operational characteristics of the reaction disc and initial operational curve are located adajcent the reaction disc to modify the communication of a pressure differential developed force to the reaction disc for the now modified partially assembled brake booster components. An input force is again applied to the control valve to simulate a second brake application. The pressure differential developed force is communicated through the spacers to produce a second operational force. A curve corresponding to the second operational force is compared with the reference curve to inform an operator to either accept or reject the modified partially assembled brake booster components. If accepted, additional components are thereafter joined to the modified partially assembled brake booster components to complete the assembly. If rejected, the modified partially assembled brake booster components are removed from the assembly line.

6 Claims, 4 Drawing Sheets

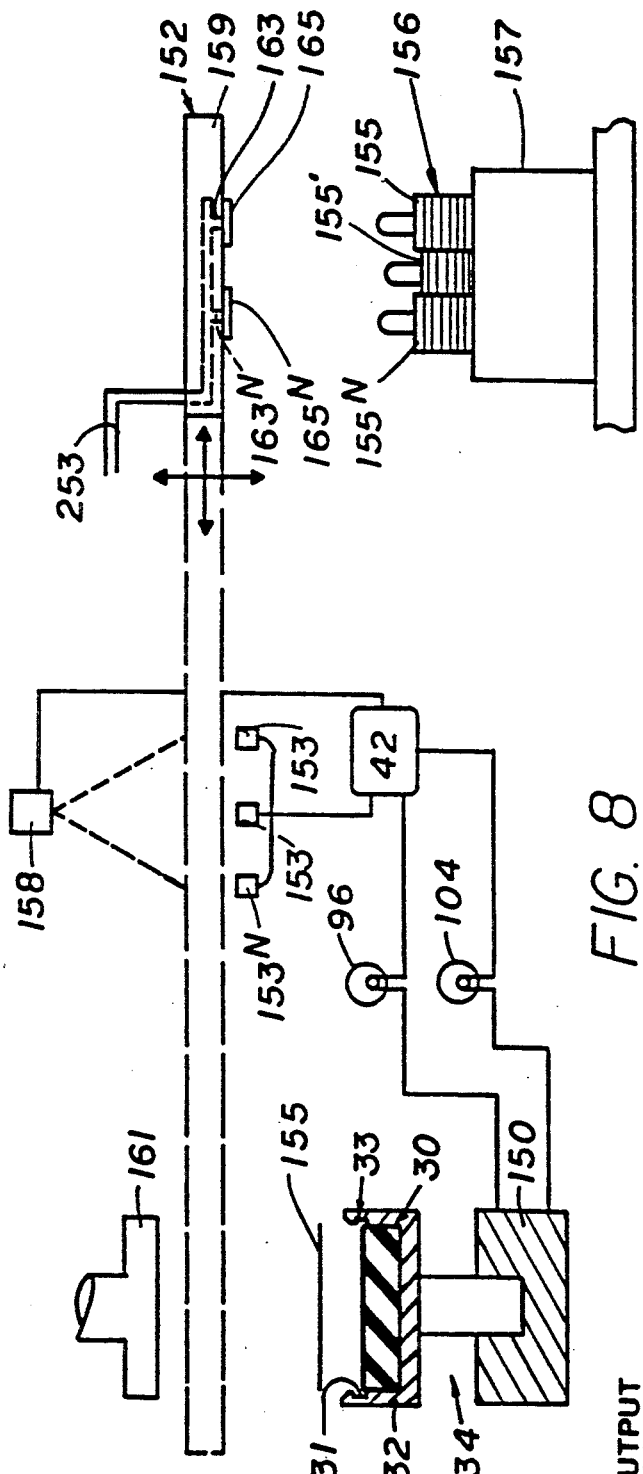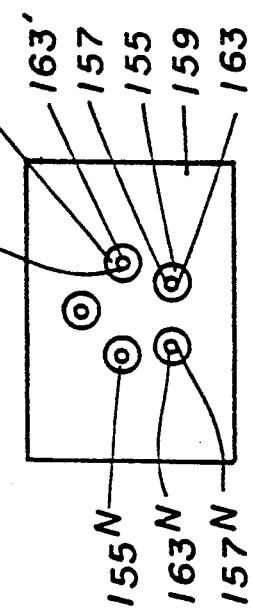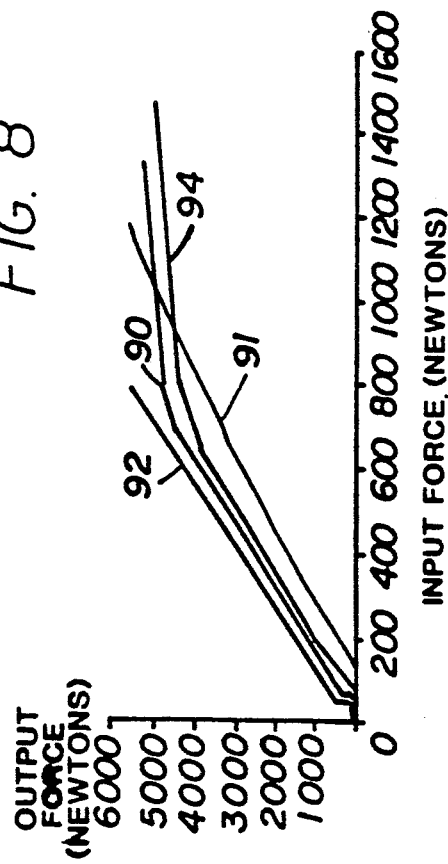
FIG. 8
FIG. 9
FIG. 7

METHOD OF EVALUATING A PARTIALLY ASSEMBLED BRAKE BOOSTER

This invention relates to a method of evaluating the operational characteristics of a partially assembled brake booster by comparing an initial output force produced by an input force applied through a control valve with a reference output force. If the initial output force is acceptable, additional components are joined to the partially assembled brake booster to complete the assembly. If the initial output is unacceptable, spacers are located between a reaction disc and hub to modify the partially assembled brake booster. An input force is again applied to the control valve and a modified output force produced by the modified brake booster is compared with the reference output force. If the modified output force is acceptable, additional components are thereafter joined to the partially assembled brake booster to complete the assembly. If the modified output force is unacceptable, the modified partially assembled brake booster is removed from the assembly line.

Brake boosters are normally manufactured on an assembly line by building up parts until a completed assembly is achieved. Thereafter, the operational characteristics of the assembled brake booster are evaluated with a standard for acceptability. U.S. Pat. No. 4,268,945 illustrates a method of sequentially assembling components to produce a unitary sealed structure of such a brake booster. While this type assembly is satisfactory for most operations, should the manufacturing tolerances of a component or combination of components such as the reaction disc, output member or control valve be unacceptable, the brake booster may be completely assembled before an operator is aware of a problem.

We have devised a method of evaluating the operational characteristics of a partially assembled booster and if required modify the structure during assembly to change the operational characteristics of the brake booster to conform with a reference level of operation. In our method of assembly, a reaction disc and output member are placed in an extrusion fixture to obtain information relating to the operational characteristics of the reaction disc in response to an applied input force. This information is stored in a computer. Thereafter, the reaction disc and output member are placed in the bore of a hub located in a shell. An input force is applied to a control valve in the hub to simulate a brake application and create an initial force which is communicated from the hub to the output member through the reaction disc to produce an initial brake force. An operational curve produced by the initial output force is compared in the computer with a reference curve representing a desired output force to inform an operator to either accept or reject this partially assembled brake booster. If the initial output force is acceptable, additional components are added to the partially assembled brake booster to thereafter complete the assembly. If the initial output force is unacceptable, the computer make a decision that the partially assembled brake booster can either be modified or rejected at this time. If the computer determines that the output member can not be modified to bring the operational curve within a desired range of the reference curve, the partially assembled brake booster is rejected. However, if the output member can be modified to bring the operational curve within the desired range of the reference curve, the output member is removed from the bore of the hub and placed in a shimming fixture. Information relating to the operational characteristics of the reaction disc and the initial output force developed by the simulated brake application are evaluated in the computer. The computer provides a shimming fixture with a signal to select spacer disc from a supply which are inserted in the head of the output member adjacent the reaction disc. The output member is thereinafter inserted in the bore and an input force is applied to the control valve to simulate a second brake application. In this second simulated brake application, the output force is communicated from the hub to the output member by way of the spacer disc and reaction disc to produce a modified operational force. Thereafter, a curve produced by the modified operational force is compared with the reference curve to inform an operator either accept or reject the modified partially assembled brake booster. If the modified operational curve is acceptable, additional components are joined to the modified partially assembled brake booster to thereafter complete the assembly of the brake booster. If the modified operational curve is unacceptable, the modified partially assembled brake booster is removed from the assembly line.

An advantage of this invention resides in the evaluation of an operational curve developed during a simulated brake application of a partially assembled brake booster to provide information relating to the need to modify the components before completing the assembly of a brake booster.

An object of this invention is the ability of accepting or rejecting a partially assembled brake booster by comparing an operational curve developed during a simulated brake application with a reference curve.

A further object of this invention is to provide a method of evaluating a partially assembled brake booster and modifying the manner through which an output force is communicated to an output member when a projected output force is not within limits of a reference output force during assembly of the components that make up a brake booster.

A still further object of this invention is to provide a method of manufacturing a brake booster wherein information relating to operational characteristics of a reaction disc and an initial operational force are evaluated by a computer and if necessary a modification is made through which the output force is communicated to an output member to create a desired operational force for the brake booster.

These advantages and objects should be apparent from viewing the drawings while in conjunction with the specification wherein:

FIG. 7 is a graph illustrating an operational curve developed during the simulated brake application;

FIG. 8 is schematic illustration of a shimming apparatus for selecting and attaching spacers to the output member to modify the operational characteristics of the brake booster;

FIG. 9 is an enlarged sectional view of an indexing platen member for the shimming apparatus through which spacer members are obtained from a supply;

Figures 5, 12:
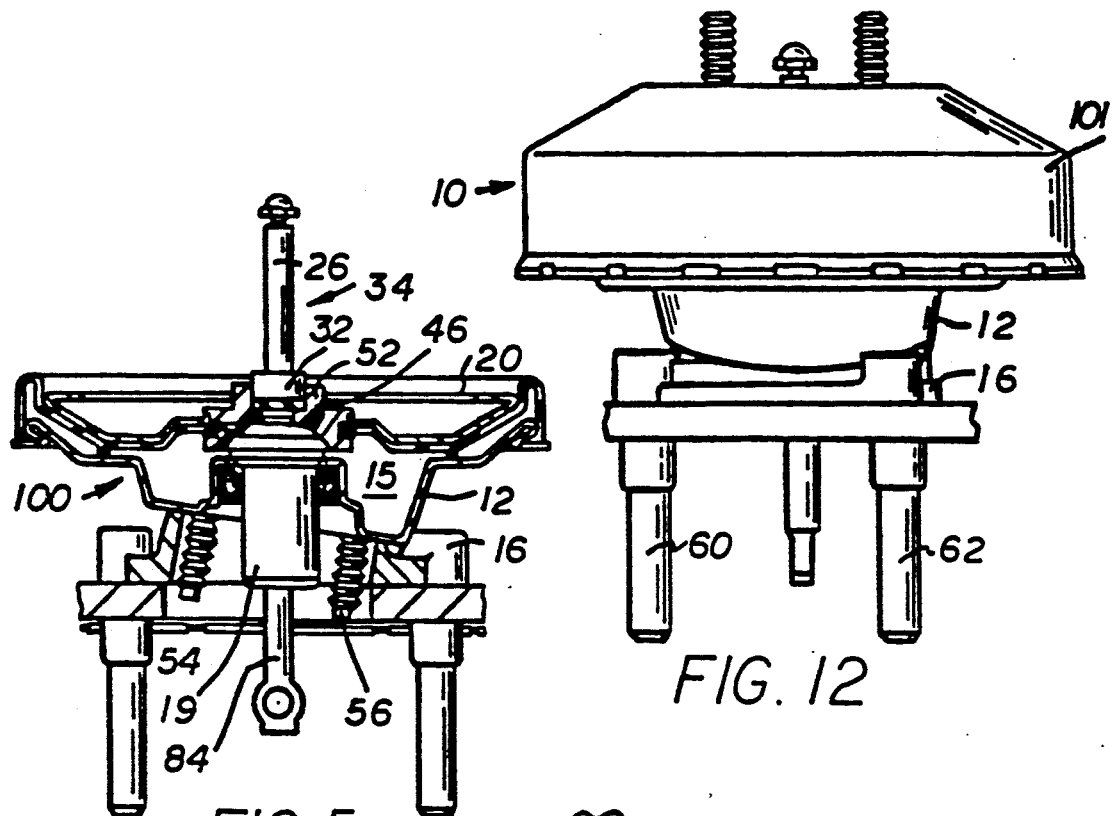
FIG. 5 is a sectional view of the brake booster of FIG. 1 with the output member of FIG. 2 located in a bore of the hub of the separation wall.
Figure 6:
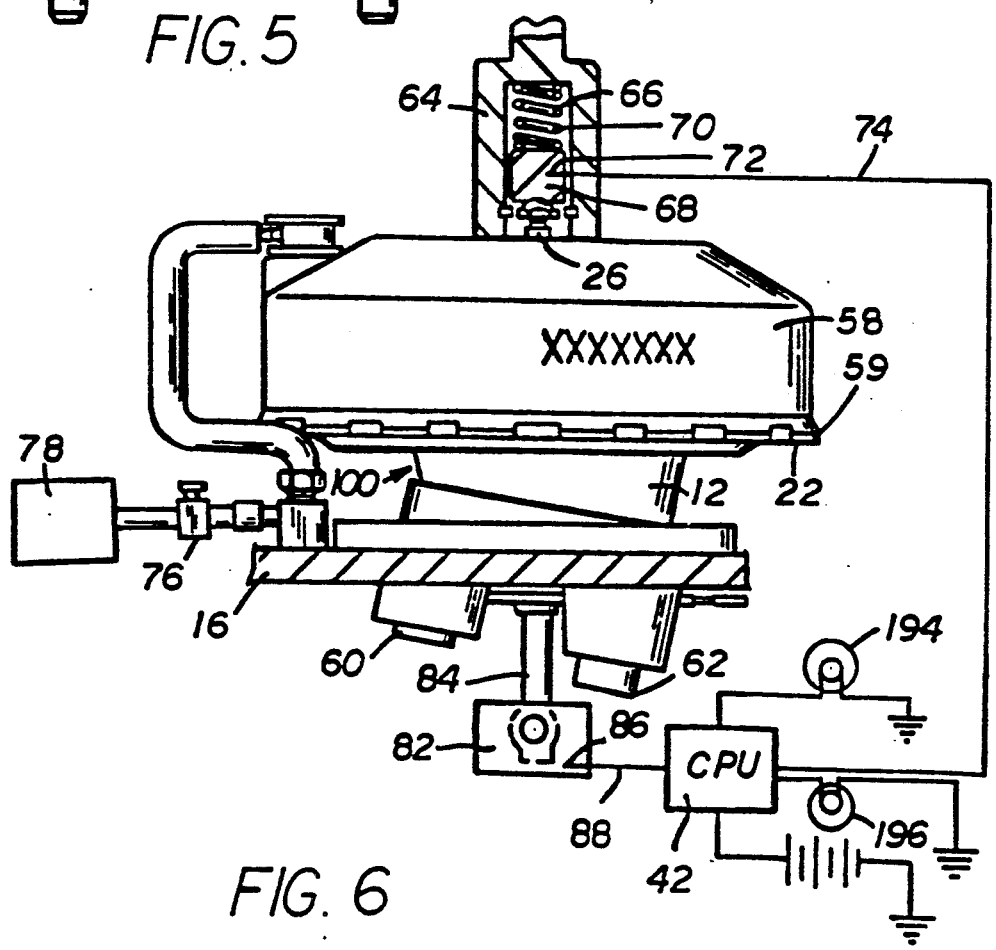
FIG. 6 is a schematic illustration of a test fixture for simulating a brake application to evaluate the operational characteristics of the partially assembled brake booster of FIG. 5.
Figure 10:
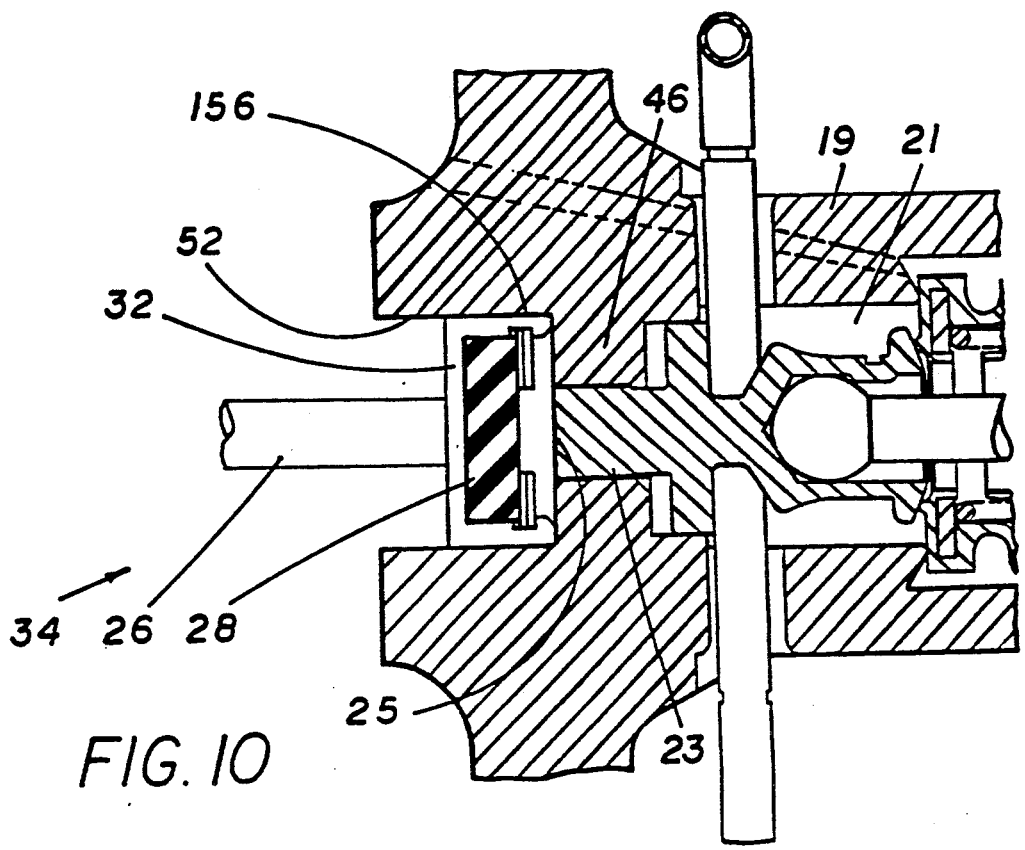
Figure 11:
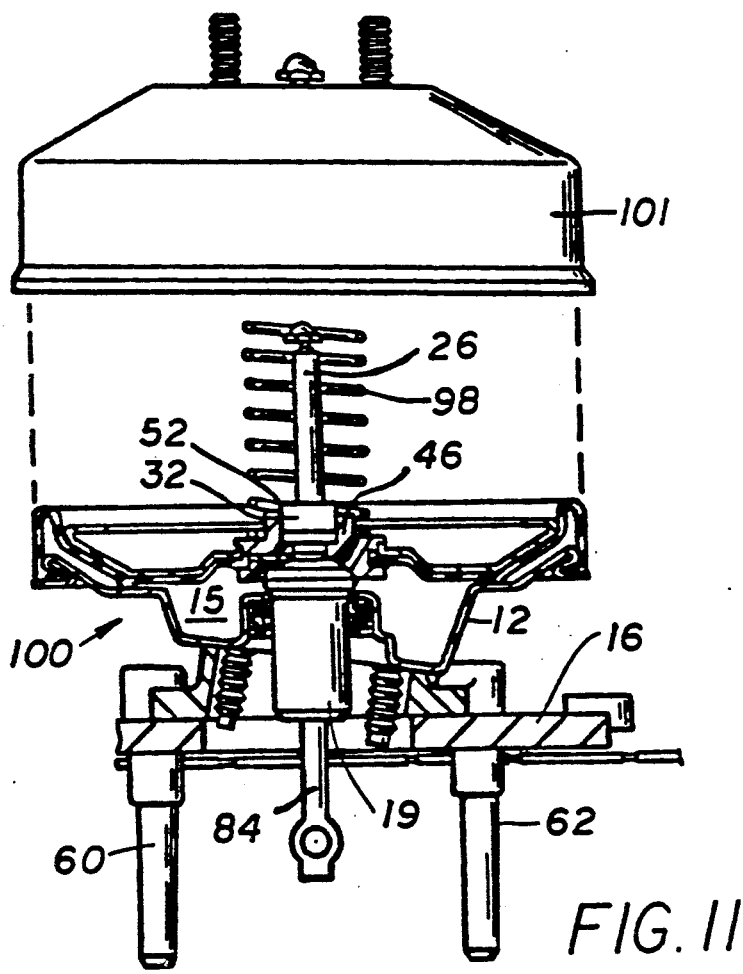

FIG. 10 is an enlarged sectional view of the spacer, reaction disc and push rod which make up the output member located in the hub of the brake booster; and FIG. 11 is a schematic illustration of the partially assembled brake booster located on a fixture in the assembly line wherein a front shell is positioned on the rear shell; and FIG. 12 is a schematic illustration of a fully assembled brake booster.

The brake booster 10 shown in FIG. 12 was manufactured according to the principles disclosed herein. In this method of assembly, components are evaluated by simulating operational conditions during the assembly. If a desired operational force is not obtained from an initial evaluation, the components are modified to change the operational characteristics to assure successively assembled brake boosters have substantially identical operating parameters.

Figure 1:
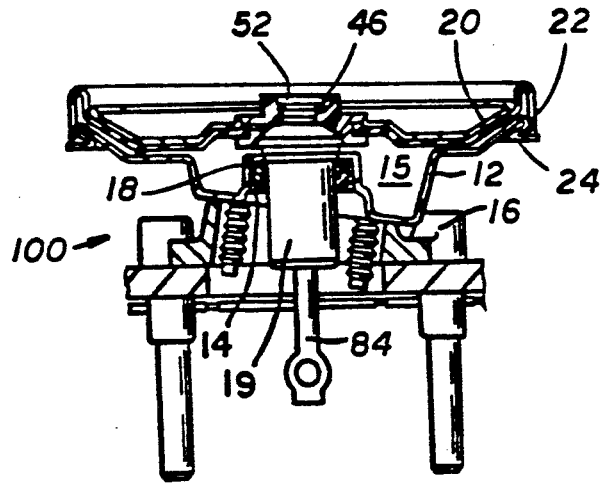
FIG. 1 is a sectional view of a partially assembled brake booster located on a fixture in an assembly line.

For the purposes of this method of assembly, the partially assembled brake booster 100 is located on a fixture 16 at a station in an assembly line as illustrated in FIG. 1. At this stage of assembly, the rear shell 12 of the partially assembled brake booster 100 already has a rear seal 14 located in an opening 18 in the rear shell 12, a hub member 19 with a control valve 21 of the type disclosed in U.S. patent application Ser. No. 646,306 filed Jan. 25, 1991, the hub member 19 extends through the opening 18, a diaphragm assembly 20 is attached to the hub member 19 and a bead 22 of the diaphragm assembly 20 is located on a peripheral ledge 24 of shell 12 to define chamber 15 with shell 12.

Figure 2:
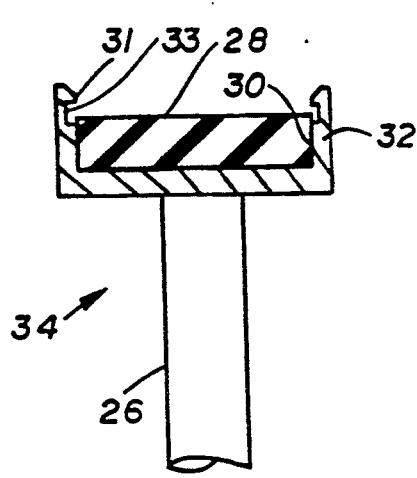
FIG. 2 is a sectional view of an output member for use in the brake booster of FIG. 1.

A push rod 26 and reaction disc 28 are selected from a source of supply in the assembly line. The reaction disc 28 is inserted into a bore 30 in head 32 on the push rod 26 to define an output member 34 as shown in FIG. 2.

Figure 3:
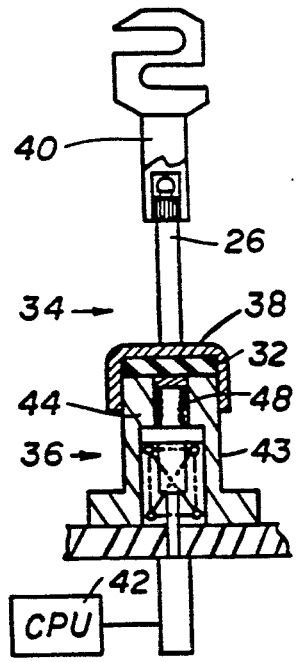
FIG. 3 is a schematic view of an extrusion fixture apparatus for evaluating the reaction disc of the output member of FIG. 2.
Figure 4:
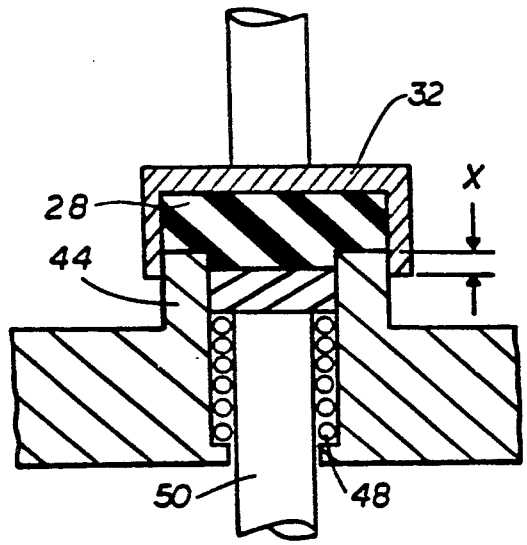
FIG. 4 is an enlarged sectional view of the extrusion of the reaction disc in response to an input force.

Thereafter, the output member 34 is placed in an extrusion fixture 36 as shown in FIG. 3 to measure the operational characteristics of the reaction disc 28 in response to an input force. The extrusion fixture 36 includes a load cell 40 which is attached to the end of the push rod 26 and a sensor section 43 with has a LVDT connected to a computer or cpu 42. The sensor section 43 has a pedestal 44 with a surface area which corresponds to a separation and bearing wall 46 associated with bore 52 in hub 19. An input force of 250 pounds at a rate of approximately 50 pounds/second is applied to output member 34 through load cell 40. When this input force is applied, reaction disc 28 is compressed between head 32 and pedestal 44. At some force, a portion of reaction disc 28 is extruded into bore 48 of pedestal 44, as shown in FIG. 4. Plunger 50 located in bore 48 is moved by that portion of the reaction disc 28 extruded into bore 48 a distance "x" to provide information relating to the operational characteristics of the reaction disc 28. This information is stored in the computer or cpu 42 for later use with respect to any necessary modification of the output member 34. Output member 34 is removed from extrusion fixture 36 and placed in bore 52 of hub 19 as shown in FIG. 5. Thereafter, head assembly 58 is brought into engagement with shell 12 to obtain a graduation curve which provides an indiction of the potential output force that could be produced by a brake booster constructed with the components in the partially assembled brake booster 100.

The head assembly 58 has a peripheral ledge 59 which engages bead 22 to create an internal vacuum chamber opposite chamber 15 adjacent diaphragm assembly 20. Head assembly 58 also has a housing 64 with a bore 66 located therein for retaining a piston 68. A spring 70 in bore 66 acts on piston 68 to simulate the operation of a master cylinder. A strain gage 72 responds to movement of piston 68 to create an operational signal corresponding to the operational force. This operational signal from strain gage 72 is connected by lead 74 to computer 42 to provide a record of the operational characteristics of a partially assembled brake booster 100.

With the head assembly 58 engaging shell 12, valve 76 is opened and about 20 inches of Hg is provided from source 78 to evacuate air from chamber 15 in the partially assembled brake booster 100. An actuator 82 connected to the push rod 84 has a strain gage 86 connected to computer 42 by lead 88. An input force of approximately 50 pounds is applied by the actuator 82 to the control valve 21 to simulate a brake application. The input force operates the control valve 21 to allow air to enter chamber 15 and create a pressure differential across the diaphragm assembly 20. This pressure differential acts on the hub 19 and is carried through the reaction disc 28 to push rod 26 for moving piston 68 in head assembly 58. The output signal as developed by strain gage 72 is communicated to computer 42 to develop operational curve 90 as shown in FIG. 7 which is indicative of the expected operational characteristics of brake booster 10. Head assembly 58 is thereafter withdrawn from engagement with shell 12.

After obtaining the operational curve 90, the output member 34 is removed from bore 52 and placed in an indexing fixture 150 associated with a shimming station illustrated in FIG. 8 for further processing. If operational curve 90 is within limits 92 and 94, a green indicator light 96 is activated to inform the operator that the output member 34 is acceptable and can be reinserted as is into bore 52. Thereafter, the partially assembled brake booster 100 is transported to a station in the assembly line illustrated in FIG. 11 where a return spring 98 is placed on hub 19 and shell 101 affixed to shell 12 to complete the assembly to the brake booster 10 as shown in FIG. 12. However, if the initial operational curve is outside limits 92 and 94 as indicated by curve 91 and can not be corrected, a red indicator light 104 is activated to inform an operator that the partially assembled brake booster 100 comprising shell 12, hub 19, control valve 21, diaphragm assembly 20 and output member 34 can not be modified to meet a desired operational standard and should be rejected.

In those instances where the initial operational curve 91 while outside of the limits 92 and 94 but the computer 42 determines that output member 34 could be modified by the addition of spacer means 156 at the shimming station illustrated in FIG. 8, to bring the operational curve within the limits of the reference curve, the operation at the shimming station based on information stored in the computer 42 involves the following steps.

The operation of the structure at the shimming station is sequentially controlled by computer 42. Initially, a selector arm 152 associated with a ram head 161 moves in horizontal plane to a supply magazine 157. The ram head 161 moves platen 159 on the selector arm 152 over a plurality of disc 155,155' . . . 155$^N$ retained at the supply magazine 157. The platen 159 as shown in FIG. 9 has a plurality of openings 163, 163' . . . 163$^N$ which are aligned over and moved toward the plurality of disc 155, 155' . . . 155$^N$. A vacuum connected to the platen 159 by conduit 253 acts on and moves disc 155, 155' . . . 155$^N$ onto projections 165, 165' . . . 165$^N$ of the bottom of the platen 159. Thereafter, selector arm 152 moves the platen 159 to a location where a proximity sensors 153, 153' . . . 153$^N$ verifies that only a disc is positioned on projections 165, 165' . . . 165$^N$ and an optical scanner 158 checks the inner diameter 157, 157' . . . 157$^N$ on each disc 155, 155' . . . 155$^N$. Should sensors 153 or scanner 158 determine that any of the disc 155, 155' . . . 155$^N$ do not meet acceptable specifications, selector arm 152 moves the platen 159 to a dump station where these are discarded. Thereafter, selector arm 152 moves the platen 159 to magazine 157 for reloading or obtaining new disc 155, 155' . . . 155$^N$ from the magazine 157 as described above. If the disc 155, 155' . . . 155$^N$ as determined by sensors 153 and scanner 158 are acceptable, selector arm 152 moves platen 159 to a position over indexing fixture 150. In response to a signal from computer 42, a force F is applied by ram head 161 to move platen 159 toward head 32 on output member 34. The force F moves the peripheral edge of disc 155 past lip 31 into groove 33 on head 32 to develop a modified output member 34'. Thereafter the ram head 161 is moved away from head 32 and a fixture 150 indexed to a second position in alignment with disc 155. If computer 42 supplies ram head 161 with an additional input signal ram 161 moves platen 159 toward head 32 to place disc 155' in bore 30 adjacent disc 156. The required thickness of 155, 155' . . . 155$^N$ that make up the spacer means 156 and create the modified output member 34' is derived from the information stored in the computer 42 relating to the operational characteristics of the reaction disc 28 and the initial output force produced by the simulated brake application. From our testing, we have determined that spacer means 156 having a total thickness of 0.025 inches may be used to develope a modified output member 34' before a resultant modified brake booster should be rejected as being out of compliance with a standard. After the disc 156, 156' . . . 156$^N$ are placed in bore 30 to achieve the desired thickness of spacer means 156 the now modified output member 34' is reinserted into bore 52 of hub 19 as best shown in FIG. 10. The sequence of the components in bore 52 adjacent bearing wall 46 is now spacer means 156, reaction disc 28 and head 32 of the output member 34'. As is clearly shown in FIG. 10, the space relationship between the end 25 of plunger 23 of control valve 21 and reaction disc 28 is changed through the addition of spacer means 156. The change in space relationship correspondingly modifies the communication of the reaction force communicated to plunger 23 from the resistance to movement of the modified output member 34' by the force created by the pressure differential developed across diaphragm assembly 20 for the modified partially assembled brake booster 200.

When output member 34' is inserted into bore 52, head assembly 58 is again brought into engagement with shell 12 to obtain a new graduation curve for the modified partially assembled brake booster 200. A new operational signal is developed by strain gage 72 as a result of a force applied to push rod 84 to second simulated brake application. The input force operates control valve 21 and produce a force which is communicated through the modified output member 34'. The operational signal from strain gage 72 is communicated to computer 42 to develop an operational curve 90 from the second simulated brake application derived from the output force produced by the partially assembled brake booster 200 equipped with modified output member 34'. If the operational curve is within limits 92 and 94 such as curve 90 shown in FIG. 7, green indicator light 196 is activated and head assembly 58 is disengaged from shell 12. Thereafter, the modified partially assembled brake booster 200 is now transported to a station in the assembly line illustrated in FIG. 11 where a return spring 98 is placed on hub 19 and shell 101 affixed to shell 12 to complete the assembly to the brake booster 10 as shown in FIG. 12. If the operational curve from the second simulated brake application is outside limits 92 and 94 as illustrated by curve 91 in FIG. 7, red indicator light 194 is activated to inform an operator that the modified partially assembled brake booster 200 comprising shell 12, hub 19, control valve, diaphragm assembly 20 and output member 34' does not meet the desired operational requirements and should be rejected before any additional components are joined thereto.

In this method of assembling a brake booster 10, the operational characteristics of a partially assembled brake booster can be initially evaluated by simulating a brake application produced by a input force applied to a control valve 21 to develop a pressure differential which acts on a hub 19 to create a force which communicated through an output member 34. An operational curve derived in a computer 42 from a signal corresponding to the output force from the output member of the partially assembled brake booster is compared with a reference curve to either accept or reject the partially assembled brake booster. If the computer 42 indicates that the partially assembled booster should be rejected, spacer means are added to the output member 34 to create a modified output member 34' to modified the operational output force to meet the desired requirements.

We claim:

1. In a method of manufacturing a brake booster wherein the operational characteristics of a partially assembled brake booster comprising a first shell, hub member, diaphragm assembly, control valve, and output member, are evaluated, said first shell being located on a fixture at a station in an assembly line, said hub member extending through an opening in said first shell, said hub member having a bore for retaining said control valve, said diaphragm assembly being connected to said hub and first shell to define a first chamber therebetween, said control valve responding to a force applied by an input member to allow a first fluid to enter said first chamber and create a pressure differential, said pressure differential acting on said diaphragm assembly to develop an output force which is communicated through said hub to a push rod by way of a reaction disc located in said bore, said reaction disc modifying said output force as a function of said input force, the improvement of initially evaluating the operational characteristics of said partially assembled booster and if required a modification of the manner through which the output force is communicated to said reaction disc to bring the operational characteristics of said brake booster within a desired range, said method comprising the steps of:
- placing said reaction disc in a head of a push rod;
- moving an extrusion fixture into engagement with said reaction disc;
- applying a force to said output member to obtain information relating to the operational characteristics of the reaction disc while in said extrusion fixture;
- storing said information in a computer;
- placing said output member in the bore of said hub;
- bringing a graduation fixture into engagement with said output member to simulate a first brake application and obtain an initial operational curve for the partially assembled brake booster;
- comparing an initial operational curve produced by said first simulated brake application with a base line curve representing a desired output force to either accept or reject said partially assembled brake booster;
- moving said partially assembled brake booster to another station in said assembly line if the initial operational curve is within preset limits of said base line curve to thereafter complete the assembly of said brake booster;
- removing said push rod and reaction disc from the bore of said hub if the initial operational curve is outside said preset limits of said base line curve and placing the push rod in a shimming fixture;
- selecting spacer means from a supply based on said information stored in said computer relating to reaction disc and said initial operational curve;
- securing said selected spacer means to said push rod adjacent said reaction disc to create a modified output member;
- inserting modified output member into said bore of said hub;
- bringing said graduation curve fixture into engagement with said output member to simulate a second brake application wherein said output force is communicated through said modified output member;
- comparing a second operational curve produced by said second simulated brake application with said base curve to either accept or reject the modified partially assembled brake booster;
- moving said modified partially assembled brake booster to said another station if said second operational curve is within the preset limits of said base line curve to thereafter complete the assembly of said brake booster; and
- rejecting said modified partially assembled brake booster if said second operational curve is outside of the preset limits of said base line curve.

2. In a method of manufacturing a brake booster wherein a first shell is located on a fixture at a station in an assembly line, said first shell having a hub member extending through an opening therein, said hub member having a bore for retaining a control valve and being connected to a diaphragm assembly to define a first chamber with said first shell, said control valve responding to a force applied by an input member to allow a first fluid to enter said first chamber and create a pressure differential, said pressure differential acting on said diaphragm assembly to develop an output force which is communicated through said hub to an output member by way of a reaction disc located in said bore, said reaction disc modifying said output force as a function of said input force, the improvement in a method of evaluating the operational characteristics of a partially assembled booster and if required a modification of the manner through which the output force is communicated to said reaction disc to bring the operational characteristics of a fully assembled brake booster within a desired range, said method comprising the steps of:
- placing the reaction disc and a push rod in an extrusion fixture to obtain information relating to the operational characteristics of the reaction disc in response to an applied input force;
- storing information relating to said operational characteristics in a computer;
- placing said push rod and reaction disc in the bore of said hub to define an output member;
- simulating a brake application with an operational force being communicated from said hub to said output member through said reaction disc to create an initial brake force;
- comparing an initial curve produced by said initial output force with a reference curve produced by a desired output force to inform an operator to either accept or reject a partially assembled brake booster;
- moving said partially assembled brake booster to another station if said initial output force is within preset limits of said base line output force to thereafter complete the assembly of the brake booster;
- removing said output member from the bore of said hub if said initial output curve is outside said preset limits of said reference curve;
- selecting spacer means from a supply based on said information stored in said computer and said initial output curve;
- inserting spacer means, reaction disc and head into said bore of said hub to define a modified output member;
- simulating a second brake application wherein said output force is communicated through said modified output member; and
- comparing a second operational derived from the output force communicated from said modified output member with said reference curve to inform an operator either accept or reject said modified partially assembled brake booster.

3. The method of manufacturing a brake booster as recited in claim 2 further including the steps of:
- moving said partially assembled brake booster to another station if said modified operational curve is within the preset limits of said base line output curve to thereafter complete the assembly of the brake booster; and
- rejecting said modified partially assembled brake booster if said modified operational curve is outside of the preset limits of said reference curve.

4. The method as recited in claim 3 further including the step of;
- attaching the selected spacer means to the head of the output member with the reaction disc located between the spacer means and head to define a unitary modified output member.

5. The method as recited in claim 4 further including the step of:
- verifying the thickness of said spacer means before attaching the selected spacer means to the head.

6. The method as recited in claim 5 further including the step of:
- placing said output member in a shimming fixture and applying a force to the selected spacer to urge a peripheral surface on the selected spacer into a groove in the head to form a unitary output member before insertion into said bore to create said modified partially assembled brake booster.

* * * * *